United States Patent
Malcolm et al.

(10) Patent No.: US 6,230,157 B1
(45) Date of Patent: May 8, 2001

(54) FLATTENING COMPLEX DATA STRUCTURES IN JAVA/JAVASCRIPT OBJECTS

(75) Inventors: Jerry Walter Malcolm; Richard Dale Hoffman; Maria Azua Himmel, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/978,512

(22) Filed: Nov. 25, 1997

(51) Int. Cl.[7] .................................................. G06F 17/30
(52) U.S. Cl. ........................................................ 707/100
(58) Field of Search ................................... 707/200, 103, 707/100

(56) References Cited

U.S. PATENT DOCUMENTS

| | | | |
|---|---|---|---|
| 4,027,288 | * 5/1977 | Barton et al. | 711/113 |
| 4,390,945 | * 6/1983 | Olsen et al. | 711/110 |
| 5,504,892 | * 4/1996 | Atsatt et al. | 707/103 |
| 5,513,351 | * 4/1996 | Grantz | 707/200 |
| 5,717,860 | * 2/1998 | Graber et al. | 709/227 |
| 5,721,919 | * 2/1998 | Morel et al. | 707/203 |
| 5,740,422 | * 4/1998 | Foltz et al. | 707/9 |
| 5,784,553 | * 7/1998 | Kolawa et al. | 714/38 |
| 5,995,975 | * 11/1999 | Malcolm | 707/103 |
| 5,995,999 | * 11/1999 | Bharadhwaj | 709/200 |
| 5,999,722 | * 12/1999 | Ketterer et al. | 395/500.42 |
| 6,006,234 | * 12/1999 | Govindarajan et al. | 707/103 |
| 6,029,160 | * 2/2000 | Cabrera et al. | 707/1 |

* cited by examiner

Primary Examiner—Maria N. Von Buhr
(74) Attorney, Agent, or Firm—Jeffrey S. LaBaw; Felsman, Bradley, Vaden, Gunter & Dillion, LLP (57) ABSTRACT

To facilitate automatic code generation for Java and JavaScript applications executed over the Internet, complex nested data structures resulting from non-unique naming of data fields are flattened. Fully-qualified names for each data field are created. The fully-qualified names include the names of all nodes within a nesting path for a given data field. Where fully-qualified names become overly cumbersome, aliases may be utilized and mapped to the fully-qualified names within a correlation table. The object hierarchy for an application is thus simplified.

20 Claims, 8 Drawing Sheets

Fig. 1

(PRIOR ART)

Fig. 2

(PRIOR ART)

FLATTENING COMPLEX DATA STRUCTURES IN JAVA/JAVASCRIPT OBJECTS

BACKGROUND OF THE INVENTION

1. Technical Field

The present invention relates in general to automatic coding and testing of object-oriented applications and in particular to automatic coding and testing of Internet applications requiring complex data structures and evolving data elements and properties. Still more particularly, the present invention relates to methods and data structures for optimizing automatic code generation and testing of object-oriented Internet applications.

2. Description of the Related Art

The need for Internet application development is proliferating at an exponential rate. Additional uses for Internet data communications are constantly evolving, including efforts to establish banking over the Internet such as have been undertaken by the consortium Integrion. Additionally, the complexity of Internet applications is rapidly increasing, prompted by increased functionality demands. In such complex programs, particularly those having many different data structures to develop, hand-crafting code can be time consuming and error-prone, both for initial code generation and maintenance. Manual coding of complex data structures may be particularly cumbersome. However, there exist a number of obstacles to automatically generating and testing code for such applications, especially for object-oriented applications.

A number of object-oriented programming languages are commercially available which may be utilized to create objects for execution on a world Wide Web server or client. In some cases, such as Java objects, the objects may be sent directly to the client for execution. In other cases, such as Javascript, the object executes on the server to customize the Web page which is transmitted to the client. Some applications may include many objects of these types, and each object may contain many properties. These properties may be added by the application, or may reflect data received from an external source such as a database.

Within the applications including objects with arbitrary properties, each object must have its own constructor which understands and initializes each property on the object. In circumstances in which the objects and their properties are structured around the format of external data, when the external data format changes or evolves, the objects and their properties must concurrently change to maintain compatibility. The amount of labor required to manually write and maintain object constructors for such objects as they evolve is remarkable.

An added level of complexity in automatically generating code for object-oriented applications arises in situations where some properties need to be grouped into secondary objects or "sub-objects." In such cases, the properties appear on the sub-object and the sub-object is itself a single property on the main object. A common example is parameters which include both a value and a format property. A sub-object for the parameter is created with the two properties, and the sub-object is attached as one property on the main object. Given that data structures in a database evolve during both product development and product life cycles, typically some fluctuation in property groups specified as sub-objects occurs. Generating code which assumes a certain set of sub-objects is likely to require recoding several times during the life span of a product.

Automatic testing of object-oriented Internet applications also requires that certain obstacles be overcome. A significant portion of testing of object-oriented product involves ensuring that the correct data values are assigned to the specific properties on these objects. In cases where the objects and their properties are structured around an evolving format of external data, as described above, test cases for objects must reflect external data format changes just as the objects and their properties must change. As with the labor required to manually write and maintain object constructors, the work required to manually maintain test cases for such objects as they evolve is also considerable.

Additionally, to perform unit test and some functional verification testing, appropriate test data must be generated for each property on an object within an object-oriented application under development. As with objects and their properties and test cases for the objects, test data for the object must evolve in conjunction with changes in the external data format around which the objects and properties are structured.

Independent or test came and test data generation, to instantiate an object for testing, object constructors typically require several arguments which dictate how the object is constructed. Often these values are calculated at the time the constructor is invoked. Therefore, it may be difficult to determine the precise values passed on the constructor call for ascertaining how the object was to be constructed.

An additional obstacle to automatic testing of object-orient applications is that, for full function of the product, real data must be accessed. Typically, however, accessing real data requires many different components of the final product to be functioning, which may be difficult during early development when components are often not completed. Even in later development phases, the probabilities of problems downstream are increased in proportion to the number of components which need to be accessed. A "short path" which accesses test data without requiring additional components provides a great advantage in situations where use of test data is acceptable.

Complex nested data structures may also impede automatic code generation and testing in object-oriented applications. The Integrion "Gold Standard" financial data stream, in particular, contains complex nested data structures for both request and response data streams. The nesting is required due to utilization of non-unique names for fields inside the nested structures. For example, the name "AmtTg" is used twice in the balance inquiry response: once under "Available Balance" and once under "Ledger Balance". Thus, in order to identify the correct instance of "AmtTg," the name must be nested within the field under which it is used. Where nesting adds a significant level of complexity impeding automatic code generation and testing, the non-unique naming of data items poses a problem to flattening the data.

It would be desirable, therefore, to provide mechanisms overcoming the problems described above and enabling automatic code generation and testing for object-oriented applications. It would further be advantageous if the mechanism could be used with applications requiring large, numerous, complex, and/or nested data structures within the application data stream.

SUMMARY OF THE INVENTION

It is therefore one object of the present invention to provide methods facilitating automatic coding of object-oriented applications.

It is another object of the present invention to provide methods facilitating automatic testing of object-oriented applications.

It is yet another object of the present invention to provide a method for flattening complex data structures in object-oriented applications.

The foregoing objects are achieved as is now described. To facilitate automatic code generation for Java and Javascript applications executed over the Internet, complex nested data structures resulting from non-unique naming of data fields are flattened. Fully-qualified names for each data field are created. The fully-qualified names includes the names of all nodes within a nesting path for a given data field. Where fully-qualified names become overly cumbersome, aliases may be utilized and mapped to the fully-qualified names within a correlation table. The object hierarchy for an application is thus simplified.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
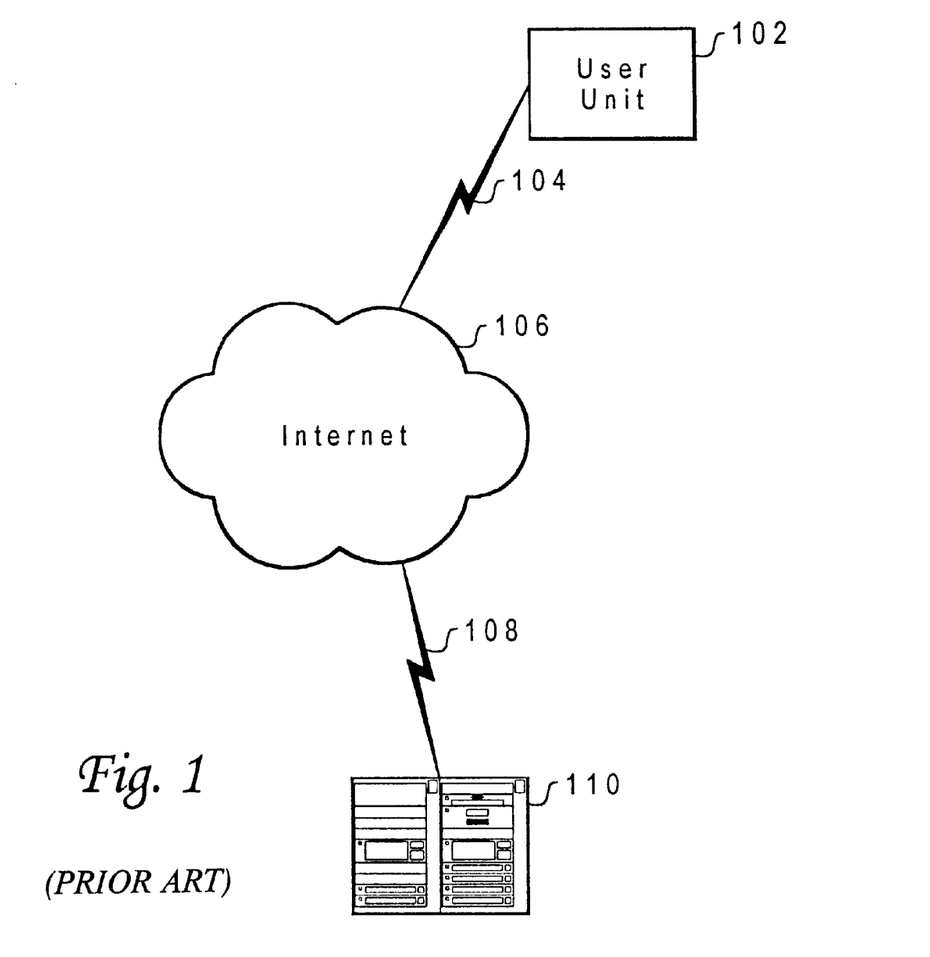
FIG. 1 depicts a network of data processing systems in which a preferred embodiment of the present invention may be implemented.

With reference now to the figures, and in particular with reference to FIG. 1, a network of data processing systems in which a preferred embodiment of the present invention may be implemented is depicted. The exemplary embodiment depicted includes a client 102 connected via communications link 104 to the Internet 106. Communications link 104 may, for example, be in the form of access provided directly by an Internet service provider (ISP) or indirectly via a proxy within a firewall, as is known in the art. Client 102 includes a Java-enabled browser application, allowing client 102 to retrieve and display information formatted in accordance with the HyperText Markup Language (HTML) and to run Java applets, or a Java interpreter, allowing client 102 to execute Java applications.

Also connected to Internet 106, via communications link 108, is server 110. Server 110 may be a World Wide Web (WWW, often simply referred to as "the Web") server capable of receiving and serving HyperText Transmission Protocol (HTTP) requests. Client 102 may thus retrieve HTML-formatted data from server 110 and display such information, executing Java applications or applets, or applications written in other object-oriented languages, in connection with such retrieval and/or display. Java applets thus executed may be object-oriented applications formulated utilizing processes facilitating automatic coding and automatic testing and optimization of data structures in accordance with the present invention.

Figure 2:
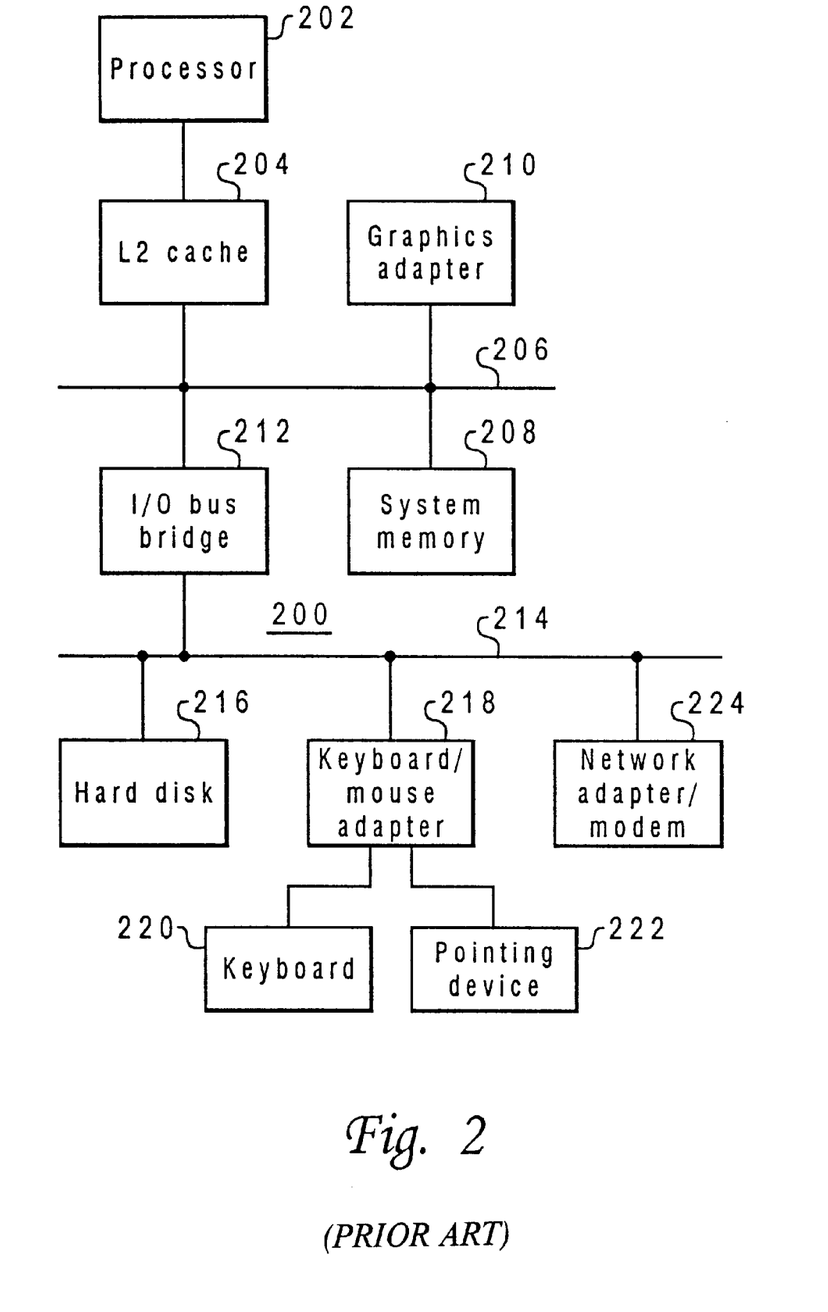
FIG. 2 is a block diagram of a data processing system utilizing mechanisms for automatic code generation and testing in accordance with a preferred embodiment of the present invention.

Referring to FIG. 2, a block diagram of a data processing system utilizing mechanisms for automatic code generation and testing in accordance with a preferred embodiment of the present invention is depicted. Data processing system 200 may be client 102 or server 110 depicted in FIG. 1. Data processing system 200 in the exemplary embodiment includes a processor 202, which may be a PowerPC™ processor available for International Business Machines Corporation of Armonk, N.Y. Processor 202 is connected to a level two (L2) cache 204, which is utilized to stage data to and from processor 202 at reduced access latency. L2 cache 204 is connected in turn to an interconnect or system bus 206, which is also connected, in the embodiment depicted, to system memory 208 and memory-mapped graphics adapter 210. Graphics adapter 210 provides a connection for a display device (not shown) on which the user interface of software executed within data processing system 200 is displayed.

Also connected to system bus 206 in the exemplary embodiment is input/output (I/O) bus bridge 212, which provides an interface between system bus 206 and I/O bus 214. A nonvolatile memory such as hard disk drive 216 may be connected to I/O bus 214, as may keyboard/mouse adapter 218, which provides connection to I/O bus 214 for keyboard 220 and pointing device 222. Pointing device 222 may be a mouse, trackball, or the like. Also connected to I/O bus 214 may be network adapter 224 for connecting data processing system 200 to a local area network (LAN), the Internet, or both. Those skilled in the art will appreciate that other devices may be incorporated into data processing system 200, such as an optical disk drive or a modem.

The operation of data processing systems of the type depicted in FIG. 2 is well known in the art. Program information comprising instructions and/or data is stored on nonvolatile memory 216 and may be selectively copied into system memory 208 once data processing system 200 is powered on. Processor 202 executes the instructions within such program information and generates text or graphical information for presentation on display device connected via graphics adapter 210, where the information may be viewed by a user. The user may selectively control operation of data processing system 200 through input entered on keyboard 220 or through pointing device 222. In the present invention, the software implements the structures and methods described below for automatic generation and testing of Java or JavaScript object code.

Figure 3:
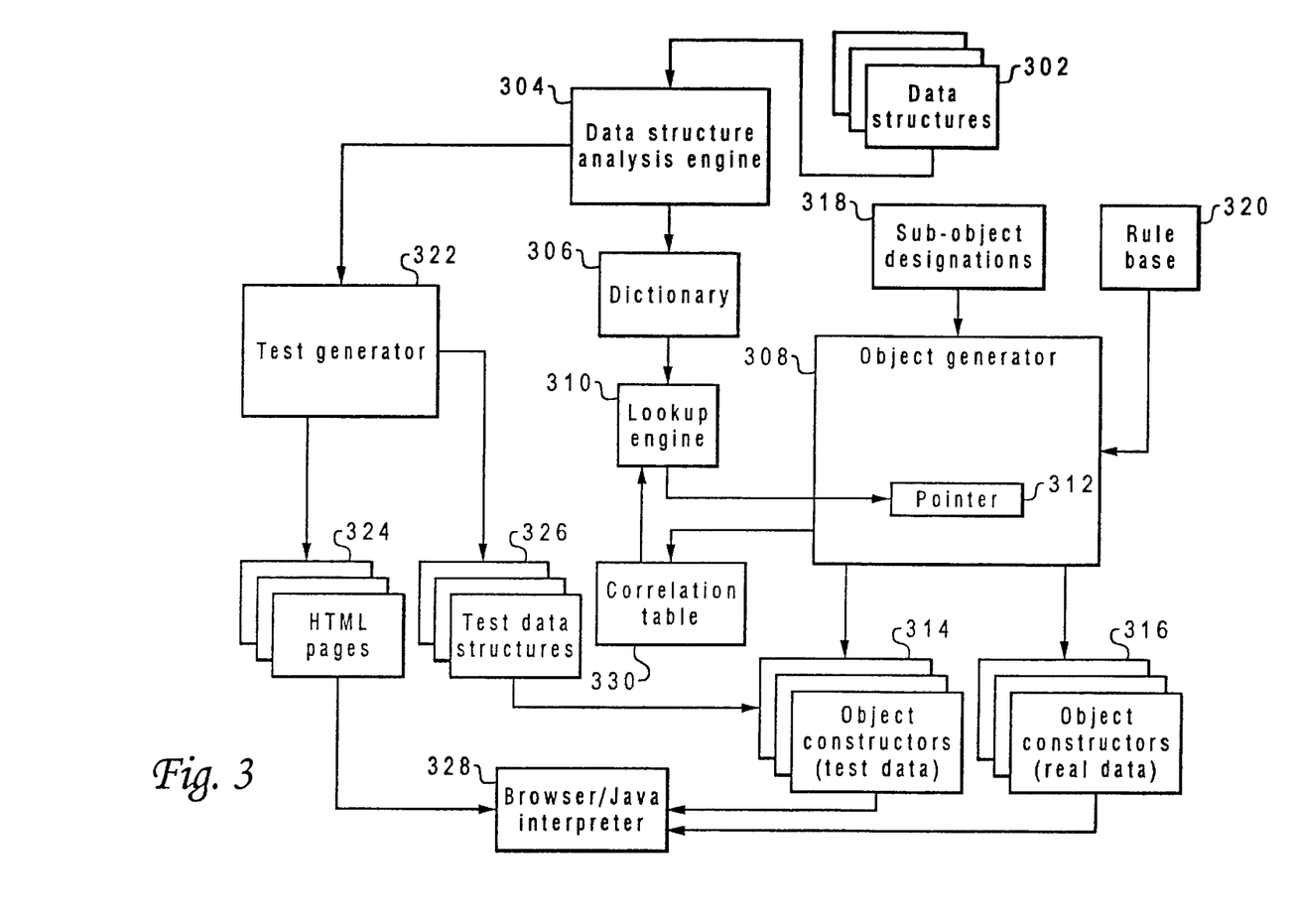
FIG. 3 depicts an implementation module diagram for a Java/JavaScript application development environment utilizing automatic code generation and testing in accordance with a preferred embodiment of the present invention.

With reference now to FIG. 3, an implementation module diagram for a Java/JavaScript application development environment utilizing automatic code generation and testing in accordance with a preferred embodiment of the present invention is depicted. Data structures 302 contain data around which an application or applet may be structured, and may comprise financial information residing on a server, such as server 110 depicted in FIG. 1, for a financial institution. Data structure analysis module 304 may be utilized to analyze data structures 302 and generate a dictionary 306 of data elements or provide other information to other modules. Dictionary 306 may be employed by an object generator 308 attempting to automatically generate objects forming a Java or JavaScript application or applet. Lookup engine 310 looks up a desired data element within dictionary 306 and returns a pointer 312 to the data element. This information may be used by object generator 308 as described below.

It is important to note that, although depicted as a single diagram, those skilled in the art will recognize that the structure depicted may actually be implemented within different data processing systems. For example, data structures 302, data analysis engine 304, dictionary 306, and lookup engine 310 may all reside on one data processing system, such as a server for a financial institution. The remainder of the modules depicted may reside on a client used to develop Java or JavaScript applications or applets.

Pointer 312 may be employed by object generator 308 to create object constructors 314 and 316, test data and real data versions, respectively. An object "constructor" is a piece of code that "constructs" or builds an object, retrieving all property values from wherever necessary and setting them as properties on the object. An input file 310 containing a designation of which properties are to be implemented as sub-objects rather than properties on an object may also be employed by object generator 308, as may a rule base 320 containing rules for naming properties on an object.

Data structure analysis engine 304 may also be utilized by test generator 322 to create HTML page test cases 324 for the object implemented by object generator 308, and to create test data structures 326 for test data versions of automatically generated object constructors 314. A browser/Java interpreter 328 may be utilized to load the HTML test cases 324 and instantiate objects from the automatically generated object constructors 314 or 316. Lookup engine 310 may also employ a correlation table 330 created by object generator 305 in instantiating objects from object constructors 314 or 316. The operation of the components depicted in FIG. 3 are described in greater detail below.

Referring to FIGS. 4A–4D, high level flowcharts for processes facilitating automatic coding in object-oriented application development in accordance with a preferred embodiment of the present invention are illustrated. These processes may be implemented within the modules depicted in FIG. 3, partially within a server such as server 110 depicted in FIG. 1 and partially within a client such as client 102 depicted in FIG. 1.

Figure 4A:
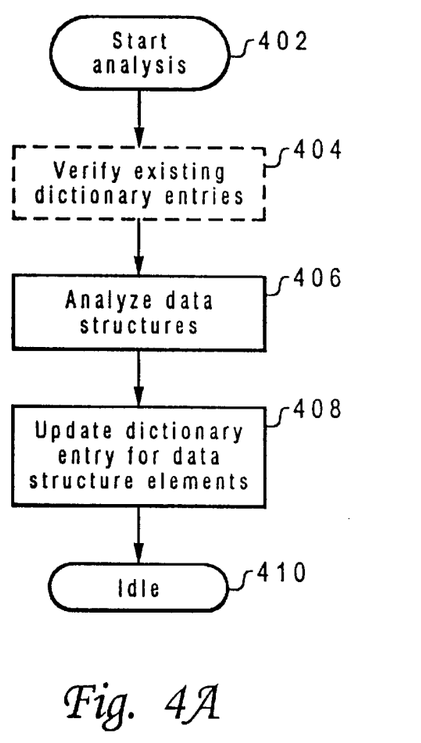
FIGS. 4A–4D are high level flowcharts for processes facilitating automatic coding in object-oriented application development in accordance with a preferred embodiment of the present invention.
Figure 4B:
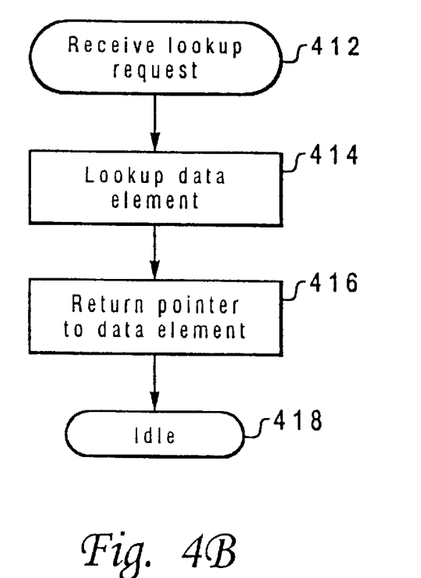

FIGS. 4A–4B illustrate a dictionary process for accessing data in data structures in accordance with a preferred embodiment of the present invention. In accordance with the present invention, a dictionary of information related to offsets, links, etc. which define each element within every data structure is created and utilized to store and retrieve all data elements in the appropriate locations within the data structures with a minimum amount of coding. In the flowchart of FIG. 4A, a process for creating a dictionary is illustrated. The process illustrated may be utilized to create a dictionary for the first time, or to update an existing dictionary. The process begins at step 402, which depicts starting analysis of the data structures utilized by an object-oriented application. The process then passes to step 404, which illustrates the optional step of verifying existing dictionary entries, if any. Such verification may be performed either by utilizing the dictionary entry to retrieve a corresponding data element, or by repeating the steps described below for the dictionary element.

The process next passes to step 406, which depicts analyzing the data structures (new and/or preexisting) to determine the offsets, links, and pointers required to get each element in every data structure. This analysis may be performed, for example, by reading and analyzing the C header files which define the data structures. From such header files, the path of offsets and pointers required to retrieve each element within a given data structure may be determined. The process then passes to step 408, which illustrates updating the dictionary entries for data structure elements analyzed. When created, the dictionary serves as a roadmap to each data structure element for a particular application. The process then passes to step 410, which depicts the process becoming idle until a subsequent dictionary creation or update is initiated.

As an example of how this process may be employed, suppose a client-side Java object needs access to a complex data structure written, for instance, in C prior to the existence of Java. In C, data structures may contain fields and pointers to other data structures, which may in turn contain fields and pointers to other data structures, which may also contain fields and pointers to other data structures, etc An example might be the user profile information for a bank customer. The top structure may have a few fields identifying the user, but may also contain a pointer to a structures containing all of the user demographic information. This demographic structure may also contain a pointer to an array of structures, one for each account which the user has at the bank. In each of these structures, if the account type is "savings," then there may be a pointer to a savings-account specific structure. Similarly, if the account type is "checking," then there may be a pointer to a checking-account specific structure. Off of one of these specific structures may be an array containing the passwords for all cosigners required for any transaction on the account.

A Java applet programmer may desire only to retrieve the first cosigner's password from the third checking account for a specific user. While it would not be particularly difficult to manually implement code for retrieving this field, this field may be one of thousands in the overall data definition. Handcrafting a single piece of code is not especially troublesome, but handcrafting thousands of pieces of code may become extremely burdensome. Additionally, as new releases of the target data structure are created, architects of the data definition may decide to add or remove intermediate structures in the profile. Every handcrafted line of code may have to change in that situation. For Internet-based transactions, the problem is further complicated by the need, in order to access the data using standard handcrafted code, to transmit the entire data structure over the Internet to the client Java object to access the desired fields. Availability of bandwidth may thus significantly impede the application.

In the present invention, the complete data definition (structures, fields, etc.) is assumed to be defined in C header files. This is a reasonable and generally accurate assumption given that header files are required for normal handcrafting of code. The header files may be analyzed to determine the "path" to any field in the entire data definition. The path to every field in the entire data definition may therefore be enumerated in a dictionary, and assigned a unique numeric identifier. For example, the cosigner password field described above may be designated element #3005. The dictionary contains information for element #3005 such as:

Begin at structure x.

Go to an offset of 110 byte into that structure.

Retrieve a pointer at that offset to another structure.

Go to offset 433 in the second structure.

At that offset is an array (of accounts, in this case).

Index to the nth element of the array based on caller input.

Go to offset in that array (now pointing to desired element).

Cast the pointer to C datatype "char *".

The lookup engine then will copy the field to the response buffer and return it to the user.

If the data structure changes from release to release, adding or removing intermediate structures, the dictionary would change to contain different paths to the same structures. However, the caller still need only request element #3005 using index 3 (for the third account). The new dictionary contains the proper path. Therefore, even if the data structure changes, the call for a predetermined element need not change. Additionally, because the lookup engine may be implemented on the server with only a request and a single element data response flows across the Internet instead of the entire data structure, significant performance improvements may be attained.

The flowchart of FIG. 4B illustrates a process for utilizing the data structure dictionary described above. By having an array or "roadmap" of each element in the data structures for an application, a generic routine may be written which interprets the dictionary and returns a pointer to the desired instance of a particular data structure element. Such a generic engine may store and retrieve all of the data elements in the appropriate location within the data structures with a minimum amount of coding. Generally, with less code to write and/or maintain, fewer errors will occur.

The generic routine begins at step 412, which depicts receiving a lookup request for a particular data element instance within a data structure, The process next passes to step 414, which illustrates looking up the requested data item instance within the dictionary, and then to step 416, which depicts returning a pointer to the desired instance of the data structure element. The process then passes to step 418, which illustrates the process becoming idle until another lookup request is received.

The dictionary process illustrated in FIGS. 4A and 4B is particularly useful in, for example, financial transactions over the Web to a particular financial institution. A financial application may consist of over 100 data transactions, each having associated request and response data structures which may include over 100 fields each, typically embedded in complex data structures. By having an array of the "roadmaps" for each element in the request/response data structures, the generic engine can store and retrieve all of the required data elements in the appropriate data structure locations with minimal coding.

Figure 4C:
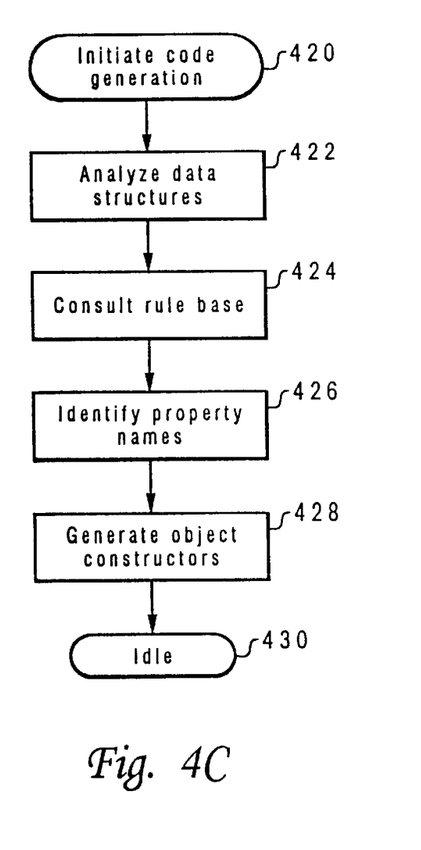

The dictionary process described above may be extended for automatic generation of object constructor code. FIG. 4C illustrates a process for automatic code/Web page generation in accordance with a preferred embodiment of the present invention. In cases where objects reflect an external data source such as a database, the data structures may be analyzed and, from an understanding of a rule base for naming properties on an object, identify the property name assigned on the object for data fields in the database data structures. Based on this information, object constructor codes may be generated. Each time the database structure changes, the same technique may be employed to automatically generate updated object constructors.

The process begins at step 420, which depicts initiation of the code generation process. The process then passes to step 422, which illustrates analyzing the data structures containing data fields from which data is sourced to a subject object. The process next passes to step 422, which illustrates analyzing data structures sourcing data to an object of interest, and then to step 424, which depicts consulting a rule base for naming properties on an object. The process then passes to step 426, which illustrates identifying the property names which are or will be assigned on the object for data fields from which data is sourced to the object of interest. The process passes next to step 428, which depicts generating the object constructor needed, and then to stop 430, which illustrates the process becoming idle until the object constructor for another object requires generation.

Continuing with the specific example described above, assuming a transaction may be sent to the bank's server which will return the user profile structure described above, a Java object may be instantiated containing, as properties, all of the user profile data returned on the transaction in that profile structure. While handcrafting a single Java object for such purposes may be routine, typically a number of objects, each having a multitude of properties, may be required. Handcrafting code for instantiating each object will thus quickly become very time-consuming. Furthermore, the data definition architects, in addition to possibly restructuring the data structures, will typically add new fields over time. Thus, a new release may include within the user profile an e-mail address and cellular phone number for the user. Code must therefore be manually added to retrieve those new fields and store them on the object. The applet which uses the object may need to be changed to do something with a new property, such as an e-mail address, and a developer may choose not to utilize this property. However, many businesses provide user profile information to other businesses, and thus still have to make it available on the object.

Since data definitions may be parsed from C header files as described above, all of the fields (properties) defined for a user profile are known. Along with automatically creating the dictionary for accessing the data, Java constructors may be generated. The generation program "writes" the code which would ordinarily have to be handcrafted. Since the file is generated, it may be discarded and regenerated when a new release of the data structures is implemented. If new fields are added in the new release, the auto-generation program picks them up when run. Therefore, essentially no coding is required to maintain the object constructors.

Figure 4D:
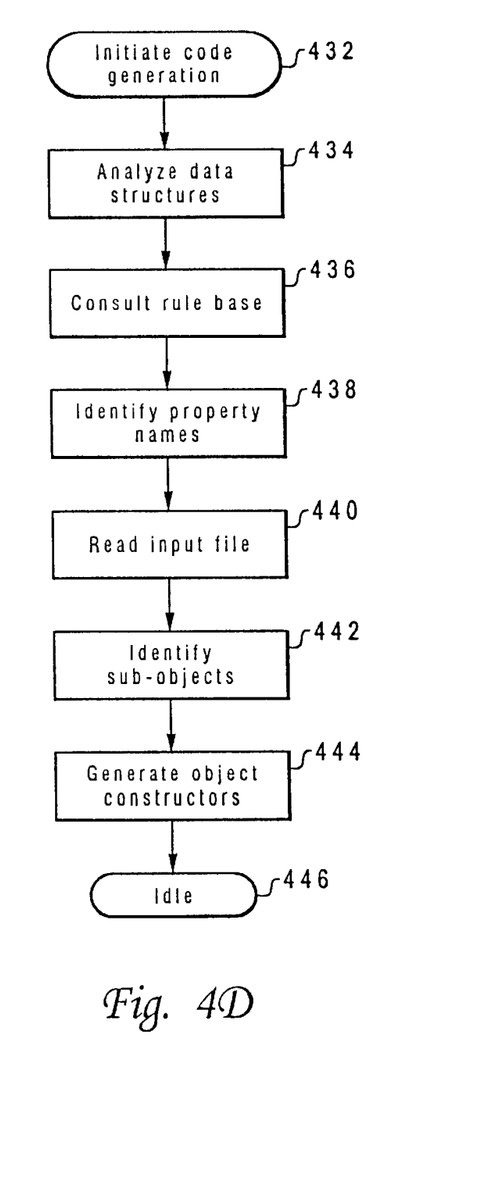

The process described above may be further extended to include automatic generation of sub-objects for particular properties on an object. FIG. 4D illustrates a simple technique for specifying object containment hierarchies in accordance with a preferred embodiment of the present invention, which may be employed in the automatic creation of sub-objects. In cases where properties appear on the sub-object and the sub-object is attached as one property on a main object, some mechanism must be provided to permit automatic creation of the sub-object. Since object constructors are determined by analyzing the database structure, the mechanism may be provided by simply specifying as an input for a utility generating object constructors a list of which groups of properties are to be come sub-objects, perhaps with a class name for each sub-object. One method of doing this is to create a separate input file listing the parent structure name for the group of attributes as found in the database structure. In this manner, nothing gets hard-coded and the list input file may be edited to add or remove properties grouped in a sub-object. Updated object constructors may then be generated.

The process begins at step 432, which depicts initiation of automatic code generation. The process next passes to step 434, which illustrates analyzing the data structures, and then to step 436, which illustrates consulting a rule base for naming properties on an object. The process then passes to step 438, which depicts identifying property names for both properties on the main object and properties on the sub-object. The process passes next to step 440, which illustrates reading in an input file specifying which groups of properties found in the database structure are to become sub-objects and listing a parent structure name for the group of attributes. The process then passes to step 442, which depicts identifying such sub-objects, and next to step 444, which illustrates generating object constructors for both main objects and sub-objects. The process then passes to step 446, which depicts the process becoming idle until code generation is again initiated.

The mechanism for automatically generating sub-objects described above facilitates automatic code generation in circumstances where multiple properties are attached on a sub-object and the sub-object is attached on the main object as a single property. An example is a date parameter, which typically requires two properties: one for the data value and one for the data format. A sub-object may be created for both properties and attached on a main object. Within the list file described above, the two properties would be specified as grouped together and a parent structure name specified for the grouped properties. Support for automatic generation of such sub-objects may be easily controlled by editing a list file.

Returning again to the specific example described above, although all properties may be ascertained from the analysis which created the dictionary, some "sets" of properties should be grouped into a subobject for manageability. An example in the context of a bank user profile is currency. In a typical, low-level data definition, four fields are utilized for one logical "currency" element: value; data precision indicator; debit/credit indicator; and ISO currency code (e.g., US$, Francs, Pounds, Yen, etc.). There are generally some specific actions which are desirable requiring these four fields, such as implementing a method to format the fields into normal readable format (e.g., −$200.00).

In the case of an account, there are two balances: Ledger Balance and Available Balance. A Java applet programmer would usually wish to treat the Ledger Balance as a "single entity," which is normally accomplished by creating a "sub-object" (called a currency object) which contains the four properties and several methods, such as one for formatting. Again, as the data definition evolves and changes, the groups of properties which should rationally be implemented as sub-objects also evolves. Even if the data definition hasn't changed, a Java programmer may decide that a specific group of properties should become a sub-object.

The auto-generation program earlier described may therefore consult an input file containing a list of C structure names (as defined in the C header files) which should be created as sub-objects. It the requirements of data definitions change, the input file contents may be changed and the auto-generation program run again to easily create the new sub-objects desired.

Generation is not the only aspect of object-oriented application development which may be time-consuming, rigorous, and burdensome; objects which have been implemented must also be tested prior to release. With reference now to FIGS. 5A–5D), high level flowcharts for processes facilitating automatic testing in object-oriented application development in accordance with a preferred embodiment of the present invention are depicted. These processes increase the automation of Web page testing, helping to shorten product development cycles in applications requiring large and/or complex data structures subject to repeated changes. These processes may be also implemented within the modules depicted in FIG. 3, operating in conjunction with the modules implementing automatic code generation, and may also be implemented partially within a server such as server 110 depicted in FIG. 1 and partially within a client such as client 102 depicted in FIG. 1.

Figure 5A:
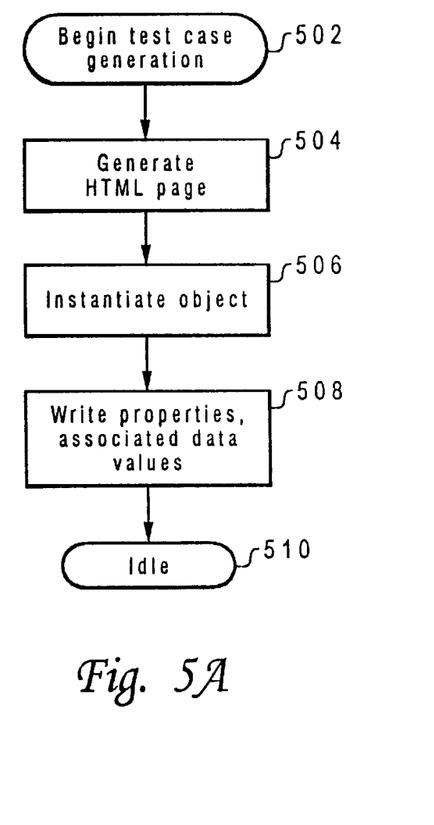
FIGS. 5A–5D depict high level flowcharts for processes facilitating automatic testing in object-oriented application development in accordance with a preferred embodiment of the present invention.

FIG. 5A depicts a process for automated generation of HTML test pages for server-side objects in accordance with a preferred embodiment of the present invention. As described above, in cases where objects reflect an external data structure such as a database, the data structures may be analyzed and, from an understood rule base, property names for data fields in the database structure may be identified. Based on this information, an HTML page may be generated for each object, where the HTML page (1) creates an instance of the object using an automatically generated constructor and (2) writes every property name and its associated data value for the object. The HTML page may be utilized as a test case and updated HTML page test cases may be generated each time the database structure changes.

The process begins at step 502, which depicts beginning test case generation for an object. The process then passes to step 504, which illustrates generating an HTML page test case for the object of interest, where the test page is configured to instantiate the object and write all properties and associated data values for the object. The process next passes to step 506, which illustrates instantiating the object, preferably utilizing the automatically generated object constructor, and then to step 508, which depicts writing all properties and their associated data values for the object to a display. The steps of 506 and 508 may be performed by loading the HTML page test case in a browser for viewing, with the page visually checked for indications of errors. The process then passes to step 510, which illustrates the process becoming idle.

Since the information to create the dictionary and the information to create the object constructors is available, test pages may also be generated. Objects and their properties are simply internal data processing system representations of data. In testing the automatically generated objects, the ability to "dump" the contents or the object (i.e. the property names and their values) into some humanly readable form is required. Thus, in the process of auto-generating the dictionary and constructors, an HTML page for each object which will display the contents in formatted HTML may also be auto-generated. While this could be done by hand, as in previous descriptions the maintenance of such pages may become time-consuming as the contents of the object change due to changes in the data structure (and potentially changes in sub-object implementation as well) In the present invention, test pages may be kept current simply by re-running the auto-generation program.

Figure 5B:
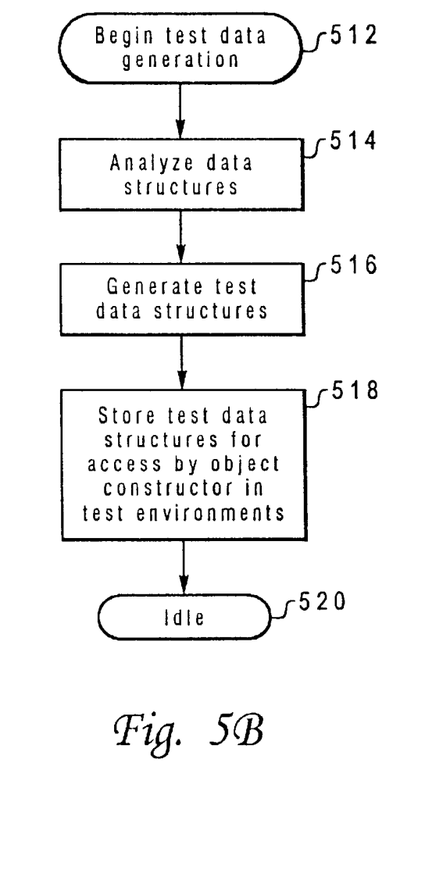

As described earlier, appropriate test data must be generated for each property on an object to perform unit test and some functional verification testing. FIG. 5B depicts a process for test data generation for objects in accordance with a preferred embodiment of the present invention. In cases where the objects reflect an external data store structure such as a database, the data structures can be analyzed to generated data structures for populating each property on the data object. This data may be stored in a manner allowing it to be accessible to the object constructor within test environments. Each time the source data structure changes, updated values for the test data structure values may be generated.

The process begins at step 512, which depicts initiating test data generation. The process next passes to step 514, which illustrates analyzing the data structures sourcing data to the object of interest, and then to step 516, which depicts generating a test data structure populating each property on the source data structure object. The process then passes to step 519, which illustrates storing the test data structure in a location and manner such that it is accessible to the object constructor of the object of interest within test environments. The process then passes to step 520, which depicts the process becoming idle.

Figure 5C:
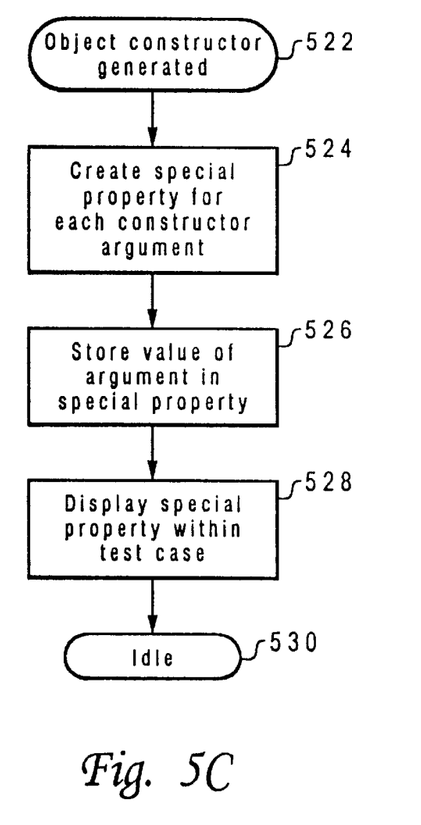

To instantiate an object using the object constructor as part of loading an HTML page test case as described above, required arguments for the object constructor must be accessible to verify that the object constructor operated properly. FIG. 5C depicts a process for echoing constructor arguments as properties on objects in accordance with a preferred embodiment of the present invention. As part of automatically generating an object constructor as described earlier, a special "echo" or "loopback" property may be created for each constructor argument and the value of the argument stored on this property. Subsequently, in generating an HTML page test case as described, the loopback argument properties may also be displayed, allowing simple visual verification that the correct arguments were passed on the object constructor. This permits automatic display of the constructor arguments on test pages in lieu of manual debug.

The process begins at step 522, which depicts generation of an object constructor. The process passes next to step 524, which illustrates creating a special property for each constructor argument, and then to step 526, which depicts storing the value of the constructor argument in the special property. The process then passes to step 528, which depicts displaying the special property in an HTML page test case, thereby displaying the value of the argument passed on the constructor call to verify that the correct argument value was passed. The process then passes to step 530, which illustrates the process becoming idle until generation of another object constructor. Those skilled in the art will understand that the process depicted may actually be implemented as portions of separate processes, such as the above-described processed for automatic generation of an object constructor and for automatically generating and displaying an HTML page test case for the object instantiated by the object constructor.

As mentioned above, a "short path" which accesses test data without requiring additional components provides a great advantage in situations where use of test data is acceptable. Unfortunately, automatically generated object constructors of the type described above typically dictate the source of the data. Editing the constructors to access test data may become extremely cumbersome where there are many objects, and there exists the possibility of test data version of an application getting out of sync with the real data version. In such circumstances, code that worked fine when debugged on the test data version may not work properly when moved to the real data version.

Figure 5D:
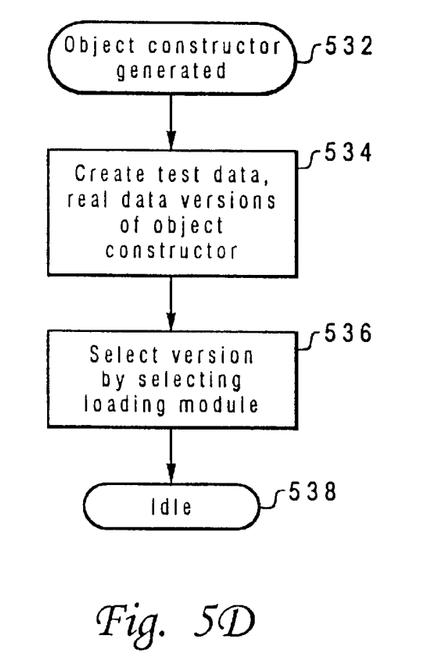

FIG. 5D depicts a process for toggling between test data and real data in accordance with a preferred embodiment of the present invention. Since the object constructors are generated automatically, two versions of each constructor may be created, one accessing test data and the other accessing real data. Two separate executables of the application may be built from these different constructor versions, with a developer toggling from real data to test data by pointing to a different load module. Since the two constructor versions are created at the same time from essentially the same generation code, the risk of problems existing in one version but not the other is minimal. Thus, productive code development and debug may progress with test data without risking problems arising upon migration to the real data. The mechanism described removes dependencies on other components during code development and avoids barriers to returning to test data once the real data path is complete and functioning.

The process begins at step 532, which depicts the object constructor being generated. The process passes next to step 534, which illustrates creating test data and real data versions of the object constructor, and then to step 536, which depicts selecting a version of the object constructor by selecting a loading module. The process then passes to step 538, which illustrates the process becoming idle until the need for toggling between real data and test data versions is again required.

Figure 6:
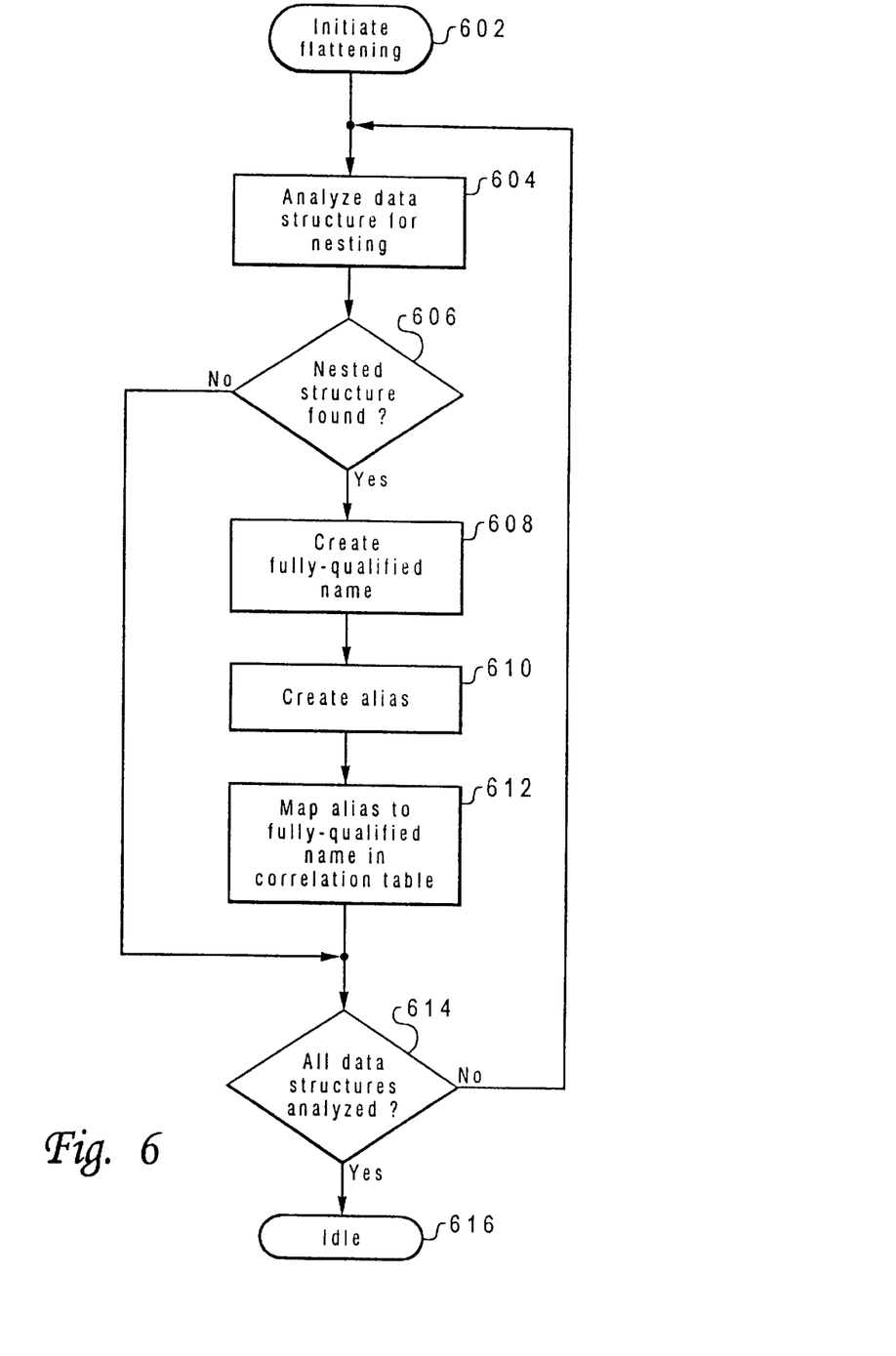
FIG. 6 is a high level flowchart for a process of flattening complex data structures in objects in accordance with a preferred embodiment of the present invention.

Referring now to FIG. 6, a high level flowchart for a process of flattening complex data structures in objects in accordance with a preferred embodiment of the present invention is illustrated. The problem of flattening complex data structures despite the use of non-unique names is solved in the present invention by creating "fully-qualified" names for each element. The fully-qualified names contain the names of all nodes within the nesting path in order to understand the true field being addressed. For example, the two Amount fields (AmtTg) previously described may be named "BalanceInquiry__LedgerBalance__Amount" and "BalanceInquiry__AvailableBalance__Amount." Since such fully-qualified names may quickly become overly cumbersome, aliases are created for the fully-qualified names, where the aliases are associated within a correlation file created to map the fully-qualified names to the aliases.

The process begins at step 602, which depicts initiating flattening of nested data structures. The process next passes to step 604, which illustrates analyzing a data structure for nesting, and then to step 606, which depicts a determination of whether a nested structure is found. If not, the process proceeds to step 614, described below. If so, however, the process proceeds to step 608, which illustrates creating a fully-qualified name for a nested data structure, and then to step 610, which depicts creating an alias for the fully-qualified name. The process next passes to step 612, which illustrates mapping the alias to the fully-qualified name in a correlation table. The process then passes to step 614, which depicts a determination of whether all data structures have been analyzed. If not, the process returns to step 604, which illustrates analyzing another data structure for nesting. If so, however, the process proceeds to step 616, which illustrates the process becoming idle.

Returning yet again to the bank user profile example, the requirement of going through structures including pointers to structures nesting to pointer to other structures, etc. The full syntax to retrieve the desired field (password for first cosigner on user's third checking account) may be:

UserProfile.Demographics.Accounts[3]
.CheckingAccount-Info.CosignerInfo

This not only is cumbersome, but also reveals more about the internal composition of the data structure than a business may wish to disclose. Plus, as the architecture changes and another structure gets added in the chain, the name would have to change.

Since the field desired is known, the data may be flattened and an alias added, such that the field would be accessed by an external programmer by the name:

Profile.Accounts[3].Cosigner

As in the other cases described above, using an auto-generation program and alias mapping structure (correlation file), rerunning the auto-generation program updates the alias mappings and an updated object constructor will be created to access. The Java programmer, however, is not impacted since the same flattened alias names still access the correct data. The shorter alias names also make programming easier and the resulting code more readable.

It is important to note that while the present invention has been described in the context of a fully functional data processing system and/or network, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of flattening nested data structures, comprising:
   determining whether an object is nested because of non-unique data field names; and
   responsive to determining that the object is nested due to non-unique data field names, associating a fully qualified data field name with the object.

2. The method of claim 1, wherein the step of associating a fully qualified data field name with the object further comprises:
   creating a name containing names of all nodes within a nesting path for the object.

3. The method of claim 1, wherein the step of determining whether an object is nested because of non-unique data field names further comprises:
   determining whether a data field name associated with the object is employed for a data field associated with a second object within an application including both the object and the second object.

4. The method of claim 1, wherein the step of determining whether an object is nested because of non-unique data field names further comprises:
   determining whether a data field name associated with an object in a request is non-unique for an application employing the request.

5. The method of claim 1, wherein the step of determining whether an object is nested because of non-unique data field names further comprises:
   determining whether a data field name associated with an object in a response is non-unique for an application employing the response.

6. The method of claim 1, further comprising:
   creating an alias for the fully-qualified name.

7. The method of claim 1, further comprising:
   mapping the alias to the fully-qualified name within a correlation table.

8. The method of claim 1, further comprising:
   identifying a fully-qualified name associated with an alias within a correlation table.

9. A mechanism for flattening nested data structures, comprising:
   means for determining whether an object is nested because of non-unique data field names;
   means, responsive to determining that the object is nested due to non-unique data field names, for associating a fully-qualified data field name with the object;
   means for creating an alias for the fully-qualified name; and
   means for mapping the alias to the fully-qualified name within a correlation table.

10. The mechanism of claim 9, wherein the means for associating a fully-qualified data field name with the object further comprises:
    means for creating a name containing names of all nodes within a nesting path for the object.

11. The mechanism of claim 9, further comprising:
    means for identifying a fully-qualified name associated with an alias within a correlation table.

12. The mechanism of claim 9, further comprising:
    a server formulating a response to a financial transaction request, wherein the server contains a plurality of objects implementing the means for determining whether an object is nested, the means for associating a fully-qualified data field name with the object, the means for creating an alias for the fully-qualified name, and means for mapping the alias to the fully-qualified name within a correlation table.

13. A computer program product within a computer usable medium, comprising:
    instructions within the computer usable medium for determining whether an object is nested because of non-unique data field names; and
    instructions within the computer usable medium, responsive to determining that the object is nested due to non-unique data field names, for associating a fully-qualified data field name with the object.

14. The computer program product of claim 13, wherein the instructions for associating a fully qualified data field name with the object further comprise:
    instructions for creating a name containing names of all nodes within a nesting path for the object.

15. The computer program product of claim 13, wherein the instructions for determining whether an object is nested because of non-unique data field names further comprise:
    instructions for determining whether a data field name associated with the object is employed for a data field associated with a second object within an application including both the object and the second object.

16. The computer program product of claim 13, wherein the instructions for determining whether an object is nested because of non-unique data field names further comprise:
    instructions for determining whether a data field name associated with an object in a request is non-unique for an application employing the request.

17. The computer program product of claim 13, wherein the instructions for determining whether an object is nested because of non-unique data field names further comprise;
    instructions for determining whether a data field name associated with an object in a response is non-unique for an application employing the response.

18. The computer program product of claim 13, further comprising;

instructions within the computer usable medium for creating an alias for the fully-qualified name.

19. The computer program product of claim 13, further comprising:

instructions within the computer usable medium for mapping the alias to the fully-qualified name within a correlation table.

20. The computer program product of claim 13, further comprising:

instructions within the computer usable medium for identifying a fully-qualified name associated with an alias within a correlation table.

* * * * *

UNITED STATES PATENT AND TRADEMARK OFFICE
CERTIFICATE OF CORRECTION

PATENT NO. : 6,230,157 B1
DATED : May 8, 2001
INVENTOR(S) : J. Malcolm et al.

Page 1 of 1

It is certified that error appears in the above-identified patent and that said Letters Patent is hereby corrected as shown below:

<u>Column 7,</u>
Line 39, please correct "," to -- . --

<u>Column 9,</u>
Line 60, please correct the word "It" to -- If --

Signed and Sealed this

Twelfth Day of March, 2002

Attest:

JAMES E. ROGAN
*Attesting Officer*     *Director of the United States Patent and Trademark Office*